United States Patent
Wang et al.

(10) Patent No.: US 8,146,345 B2
(45) Date of Patent: Apr. 3, 2012

(54) NORMALIZING OXYGEN STORAGE CAPACITY(OSC) FOR CATALYST MONITORING

(75) Inventors: Wenbo Wang, Novi, MI (US); Richard B. Jess, Haslett, MI (US); David N. Belton, Birmingham, MI (US)

(73) Assignee: GM Global Technology Operations LLC

( * ) Notice: Subject to any disclaimer, the term of this patent is extended or adjusted under 35 U.S.C. 154(b) by 893 days.

(21) Appl. No.: 11/688,406

(22) Filed: Mar. 20, 2007

(65) Prior Publication Data

US 2008/0229727 A1 Sep. 25, 2008

(51) Int. Cl.
*F01N 3/00* (2006.01)

(52) U.S. Cl. ............... 60/277; 60/274; 60/285; 60/286; 701/103; 701/109

(58) Field of Classification Search .................... 60/274, 60/276, 277, 285, 295; 701/103, 109
See application file for complete search history.

(56) References Cited

U.S. PATENT DOCUMENTS

| | | | | |
|---|---|---|---|---|
| 5,267,472 A | * | 12/1993 | Schneider et al. | 73/114.75 |
| 5,732,551 A | * | 3/1998 | Naber et al. | 60/274 |
| 5,737,916 A | * | 4/1998 | Mitsutani | 60/276 |
| 5,842,339 A | * | 12/1998 | Bush et al. | 60/274 |
| 6,116,021 A | * | 9/2000 | Schumacher et al. | 60/274 |
| 6,138,453 A | * | 10/2000 | Sawada et al. | 60/277 |
| 6,171,565 B1 | * | 1/2001 | Hohne et al. | 423/239.1 |
| 6,289,673 B1 | * | 9/2001 | Tayama et al. | 60/285 |
| 6,418,711 B1 | * | 7/2002 | Surnilla et al. | 60/277 |
| 6,655,129 B2 | * | 12/2003 | Lindner et al. | 60/277 |
| 6,877,311 B2 | * | 4/2005 | Uchida | 60/277 |
| 6,901,744 B2 | * | 6/2005 | Kako et al. | 60/285 |
| 7,582,480 B2 | * | 9/2009 | Audoin et al. | 436/37 |
| 7,793,489 B2 | * | 9/2010 | Wang et al. | 60/276 |
| 2002/0184877 A1 | * | 12/2002 | Ishii et al. | 60/277 |
| 2008/0184695 A1 | * | 8/2008 | Anilovich et al. | 60/274 |

* cited by examiner

*Primary Examiner* — Thomas Denion
*Assistant Examiner* — Jesse Bogue

(57) ABSTRACT

An oxygen storage capacity (OSC) monitoring system for a vehicle having a catalytic converter includes a control module that determines a measured OSC based on an inlet sensor signal (ISS) that is responsive to an oxygen content of exhaust flowing into the catalytic converter. The control module determines a normalization ratio based the measured OSC and determines a PASS/FAIL status of the catalytic converter based on the normalization ratio.

23 Claims, 3 Drawing Sheets

NORMALIZING OXYGEN STORAGE CAPACITY(OSC) FOR CATALYST MONITORING

FIELD OF THE INVENTION

The present invention relates to diagnostic systems for vehicles driven by internal combustion engines, and more particularly to a method and apparatus for monitoring catalytic converter efficiency.

BACKGROUND OF THE INVENTION

During the combustion process, gasoline is oxidized, and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds.

Automobile exhaust systems include a three-way catalytic converter that helps oxidize CO, HC and reduce $NO_x$ in the exhaust gas. The efficiency of the catalytic converter is periodically monitored to prevent excess CO, HC and $NO_x$ in the exhaust gas. Typically, the catalytic converter is monitored during engine steady state operating conditions. At idle, for example, the engine controller adjusts the air to fuel (A/F) ratio to achieve consistent emissions output. Traditional monitoring methods force the A/F ratio to a lean or rich condition for a predetermined period. Afterwards, the controller switches to the rich or lean condition. The controller estimates an oxygen storage capacity (OSC) of the catalytic converter based on exhaust data (e.g., the lag time between an inlet oxygen sensor and an outlet oxygen sensor detecting the lean/rich condition). The OSC is indicative of the efficiency of the catalytic converter.

Existing monitoring methods do not accurately compensate OSC measurements over catalyst temperature and mass air flow ranges. As a result, there is a lower separation between good and bad converters and increases the number of false FAIL and/or false PASS decisions.

SUMMARY OF THE INVENTION

Accordingly, the present invention provides an oxygen storage capacity (OSC) monitoring system for a vehicle having a catalytic converter. The OSC monitoring system includes a first module that determines a measured OSC based on an inlet sensor signal (ISS) that is responsive to an oxygen content of exhaust flowing into the catalytic converter. A second module determines a normalization ratio based the measured OSC and determines a PASS/FAIL status of the catalytic converter based on the normalization ratio.

In another feature, a compensation module compensates the measured OSC to provide a compensated OSC. The normalization ratio is determined based on the compensated OSC.

In other features, the second module determines a best unacceptable OSC and a worst acceptable OSC and further determines the normalization ratio based on the best unacceptable OSC and the worst acceptable OSC. The best unacceptable OSC is determined from a function based on a converter temperature and a mass air flow (MAF). The worst acceptable OSC is determined from a function based on a converter temperature and a mass air flow (MAF).

In still another feature, the second module compares the normalization ratio to a threshold normalization ratio and indicates a FAIL status when the normalization ratio exceeds the threshold normalization ratio.

In yet another feature, the OSC monitoring system further includes an outlet oxygen sensor that generates an outlet sensor signal (OSS) based on an oxygen content of exhaust flowing from the catalytic converter. The first module further determines the measured OSC based on the OSS.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
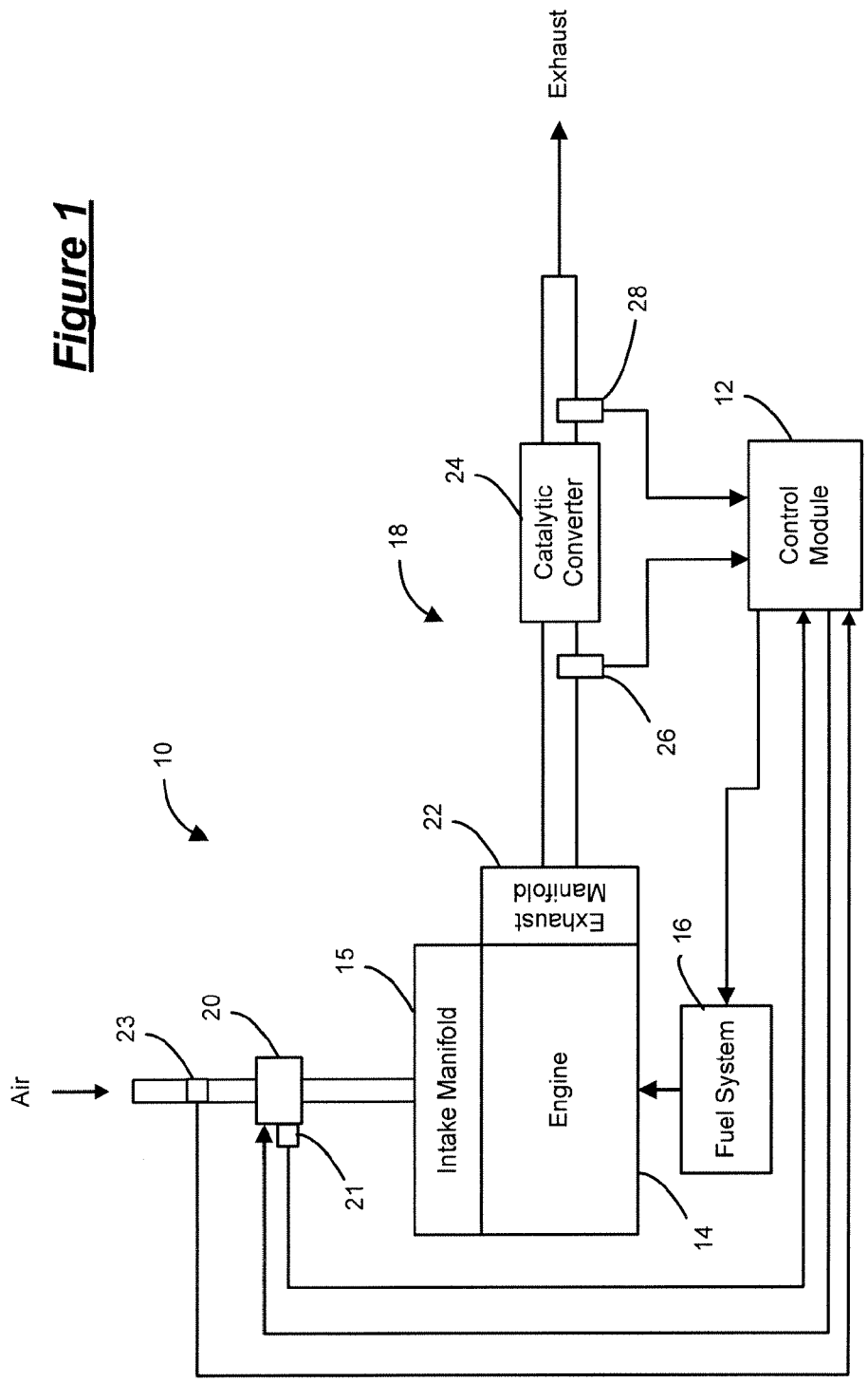
FIG. 1 is a functional block diagram of an exemplary vehicle exhaust system including a catalytic converter, an inlet $O_2$ sensor and an outlet $O_2$ sensor.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

With reference to FIG. 1, an exemplary vehicle 10 includes a control module 12, an engine 14, a fuel system 16 and an exhaust system 18. The control module 12 communicates with various sensors, actuators and valves. The engine 14 includes a throttle 20 that communicates with the control module 12. The throttle 20 regulates the amount of air drawn into the engine 14 during an intake stroke of the pistons (not shown). The engine 14 operates in a lean condition (i.e. reduced fuel) when the A/F ratio is higher than a stoichiometric A/F ratio. The engine 14 operates in a rich condition when the A/F ratio is less than the stoichiometric A/F ratio. Stoichiometry is defined as an ideal A/F ratio (e.g., 14.7 to 1 for gasoline). Internal combustion within the engine 14 produces exhaust gas that flows from the engine 14 to the exhaust system 18, which treats the exhaust gas and releases the treated exhaust gas to the atmosphere.

The control module 12 receives inputs from various sensors such as a mass air flow (MAF) 23 and/or a manifold air pressure (MAP) sensor (not shown), an intake air temperature (IAT) sensor (not shown), an engine speed (RPM) sensor (not shown), a throttle position sensor (TPS) 21, and from engine specifications to determine the air flow into the engine 14. The air flow data is used to calculate the corresponding fuel to be delivered to the engine 14 by the fuel system 16.

The exhaust system 18 includes an exhaust manifold 22, a catalytic converter 24, an inlet oxygen ($O_2$) sensor 26 located upstream from the catalytic converter 24, and an outlet ($O_2$) sensor 28 located downstream from the catalytic converter 24. The catalytic converter 24 treats the engine-out emissions by increasing the rate of oxidization of hydrocarbons (HC) and carbon monoxide (CO), and the rate of reduction of nitrogen oxides ($NO_x$), to decrease tail-pipe emissions.

To enable oxidization, the catalytic converter 24 requires air or $O_2$ and the catalytic converter 24 can release stored $O_2$ as needed. In a reduction reaction, $O_2$ is generated from $NO_x$ and the catalytic converter 24 can store the extra $O_2$ as appropriate. The $O_2$ storage/release capacity (OSC) of the catalytic converter 24 is indicative of the catalytic converter's efficiency in oxidizing the HC and CO, and reducing $NO_x$. The inlet $O_2$ sensor 26 communicates with the control module 12 and is responsive to the $O_2$ content of the exhaust stream entering the catalytic converter 24. The outlet $O_2$ sensor 28 communicates with the control module 12 and is responsive to the $O_2$ content of the exhaust stream exiting the catalytic converter 24.

The inlet $O_2$ sensor 26 and the outlet $O_2$ sensor 28 respectively generate an inlet sensor signal (ISS) and an outlet sensor signal (OSS). The ISS and OSS are voltage signals that vary based on the $O_2$ content of the exhaust. More specifically, as the $O_2$ content of the exhaust increases (e.g., A/F ratio goes high or fuel goes lean), the voltage signal decreases. As the $O_2$ content of the exhaust decreases (e.g., A/F ratio goes low or fuel goes rich), the voltage signal increases. The control module 12 receives the ISS and OSS and correlates the sensor signal voltage to the $O_2$ content level of the exhaust.

The OSC monitoring system of the present invention measures the OSC of the catalytic converter 24 to provide a measured OSC ($OSC_{MEAS}$) that is used to determine whether the catalytic converter is sufficient to properly treat emissions. More specifically, the OSC monitoring system normalizes $OSC_{MEAS}$ based on previously collected test data to provide a normalized OSC ($OSC_{NORM}$). The OSC monitoring system compares $OSC_{NORM}$ to a threshold to determine a PASS or FAIL status of the catalytic converter 24. The PASS status indicates that the catalytic converter 24 is sufficient to properly treat emissions and the FAIL status indicates that the catalytic converter 24 is insufficient to properly treat emissions.

Initially, normalization tables are generated based on test components. More specifically, a worst acceptable table is generated based on a good converter and a best unacceptable table is generated based on a bad converter. A good converter is defined as a converter that is at or below an emissions standard. A bad converter is defined as a converter that is a threshold percentage over the emissions standard. The OSC is measured for each test component at various points including, but not limited to, converter temperature, mass air flow (MAF) and A/F ratio offset. In this manner, a multi-dimensional function is generated for each test component.

$OSC_{MEAS}$ can be determined in a number of manners known in the art including, but not limited to, time-based, mass-based, wavelength-based, wave magnitude based, wave area based or sensor signal frequency-based between the ISS and the OSS. For example, $OSC_{MEAS}$ can be determined based on a lag time between the ISS and the OSS (i.e., time-based). In addition to a low or high sensor voltage indicating fuel lean or rich conditions, a reference voltage ($V_{REF}$) is used as an indicative voltage signal around the stoichiometric condition. The lag time between the ISS and the OSS achieving a threshold from commanding an A/F ratio offset is monitored and the OSC is calculated based on the lag time. Calculation of OSC based on lag time is discussed in further detail in commonly assigned U.S. Pat. No. 6,802,181, entitled Method and Apparatus for Monitoring Catalyst Efficiency and Secondary Air Injection and issued on Oct. 12, 2004, the disclosure of which is expressly incorporated herein by reference.

The OSC monitoring system determines a normalization ratio ($r_{NORM}$) based on $OSC_{MEAS}$ and other operating conditions including, but not limited to, mass air flow (MAF) and converter temperature ($T_{CONV}$). $T_{CONV}$ is determined based on, but not limited to, engine RPM and MAF. In a first step, a long-term steady-state temperature is determined according to the following relationship:

$$T_{SS}(t) = k_{RPM} RPM(t) + k_{MAF} MAF(t) + k_{OFFSET}$$

where $k_{RPM}$, $k_{MAF}$ and $k_{OFFSET}$ are constants calibrated for the specific converter type. In a second step, $T_{SS}$ is filtered (e.g., low pass) to provide $T_{CONV}$ according to the following relationship:

$$T_{CONV}(t) = T_{CONV}(t-1) + k_{FILT}(T_{SS}(t) - T_{CONV}(t-1))$$

where $k_{FILT}$ is a filter coefficient that is determined based on the rate of change of $T_{CONV}$. Two separate $k_{FILT}$s can be used based on whether the temperature is increasing or decreasing.

A compensated measured OSC ($OSC_{COMP}$) is determined based on $OSC_{MEAS}$. More specifically, a first compensation factor (f1) is determined from a function based on the percentage of ethanol present in the fuel, which can be measured by a sensor (not shown) or calculated based on a virtual sensor algorithm. A second compensation factor (f2) is determined from a function based on a short term fuel trim average that is calculated while determining $OSC_{MEAS}$. $OSC_{MEAS}$ is multiplied by both f1 and f2 to provide $OSC_{COMP}$.

A best unacceptable OSC ($OSC_{BU}$) is determined from the best unacceptable table based on MAF and $T_{CONV}$ and a worst acceptable OSC ($OSC_{WA}$) is determined from the worst acceptable table based on MAF and $T_{CONV}$. $r_{NORM}$ is clamped between 0 and 1 and is determined based on the following equation:

$$r_{NORM} = \frac{OSC_{COMP} - OSC_{BU}}{OSC_{WA} - OSC_{BU}}$$

$r_{NORM}$ is then filtered and compared to a threshold ratio. A PASS status is signaled if the filtered $r_{NORM}$ exceeds the threshold ratio and a FAIL status is signaled if the filtered $r_{NORM}$ is below the threshold ratio.

Figure 2:
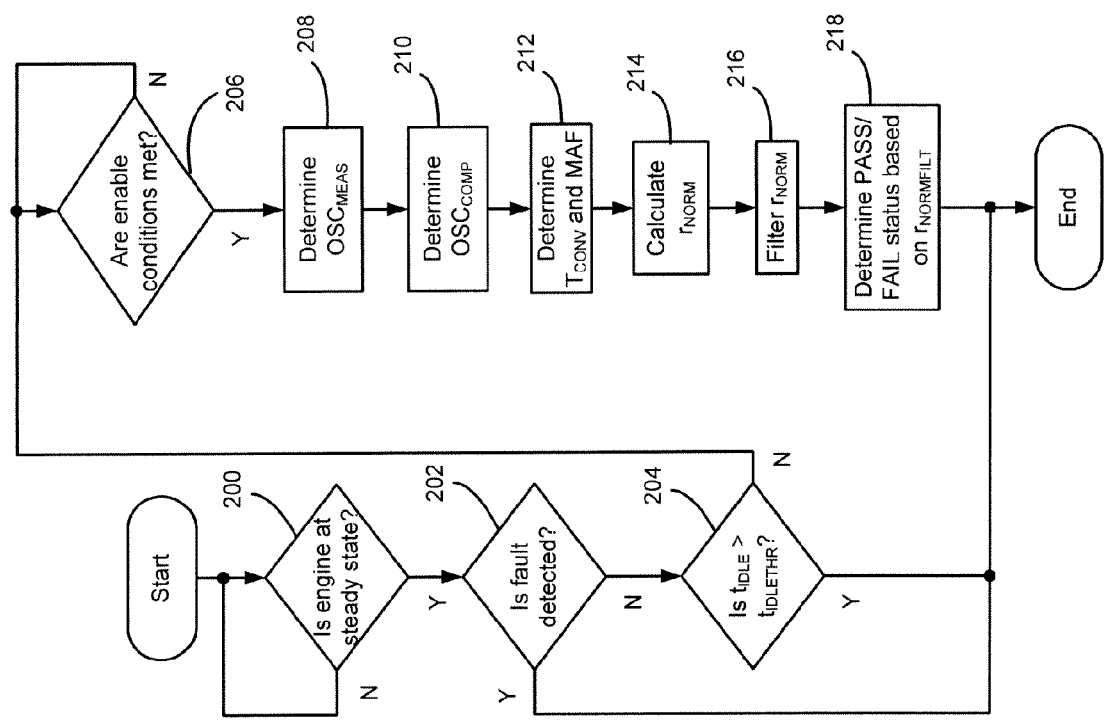
FIG. 2 is a flowchart illustrating general steps executed by the oxygen storage capacity (OSC) monitoring system of the present invention.

With reference to FIG. 2, general steps executed by the OSC monitoring system of the present invention will be described in detail. In step 200, control determines whether the engine 14 is operating at a steady state condition (e.g., idle). If the engine 14 is not operating at idle, control loops back. If the engine 14 is operating at idle, control determines whether a fault is detected in step 202. The fault can be any number of faults that prevent accurate OSC measurement including, but not limited to, a MAF sensor fault, a TPS sensor fault, an inlet $O_2$ sensor fault, an outlet $O_2$ sensor fault or a control module fault. If a fault is detected, control ends. If a fault is not detected, control determines whether an idle time ($t_{IDLE}$) (i.e., the amount of time the engine 14 has been operating at steady state) is greater than an idle time threshold ($t_{IDLETHR}$). If $t_{IDLE}$ is greater than $t_{IDLETHR}$, control ends. If $t_{IDLE}$ is not greater than $t_{IDLETHR}$, control continues in step 206.

In step 206, control determines whether enable conditions are met. Exemplary enable conditions include, but are not limited to, stable engine operation, closed-loop fuel control conditions being met, sufficient engine coolant temperature and sufficient catalyst temperature. If the enable conditions are not met, control loops back. If the enable conditions are met, control determines $OSC_{MEAS}$ in step 208. In step 210, control determines $OSC_{COMP}$ based on $OSC_{MEAS}$, f1 and f2. Control determines $T_{CONV}$ and MAF in step 212. In step 214, control calculates $r_{NORM}$ based on $OSC_{COMP}$, $OSC_{BU}$ and $OSC_{WA}$. $r_{NORM}$ is clamped between 0 and 1. More specifically, if $r_{NORM}$ is greater than 1, $r_{NORM}$ is set equal to 1 and if $r_{NORM}$ is less than 0, $r_{NORM}$ is set equal to 0. In step 216, control filters $r_{NORM}$ to provide a filtered $r_{NORM}$ ($r_{NORMFILT}$). $r_{NORM}$ is filtered using a first order lag filter to reduce test variations. In step 218, control determines the PASS/FAIL status based on $r_{NORMFILT}$ by comparing $r_{NORMFILT}$ to a threshold ratio ($r_{THR}$).

It is anticipated that a fault can be signaled based on the PASS/FAIL status decision in any number of manners. For example, a fault can be signaled when the number of FAIL status decisions exceeds a threshold number. Alternatively, a fault can be signaled based on a test cycle that includes a known number of PASS/FAIL status decisions. As another alternative, a fault can be signaled based on the number of FAIL status decisions within a threshold time period. In this case, a fault is signaled if a filtered diagnostic variable compares to a threshold and yields a FAIL status decision.

Figure 3:
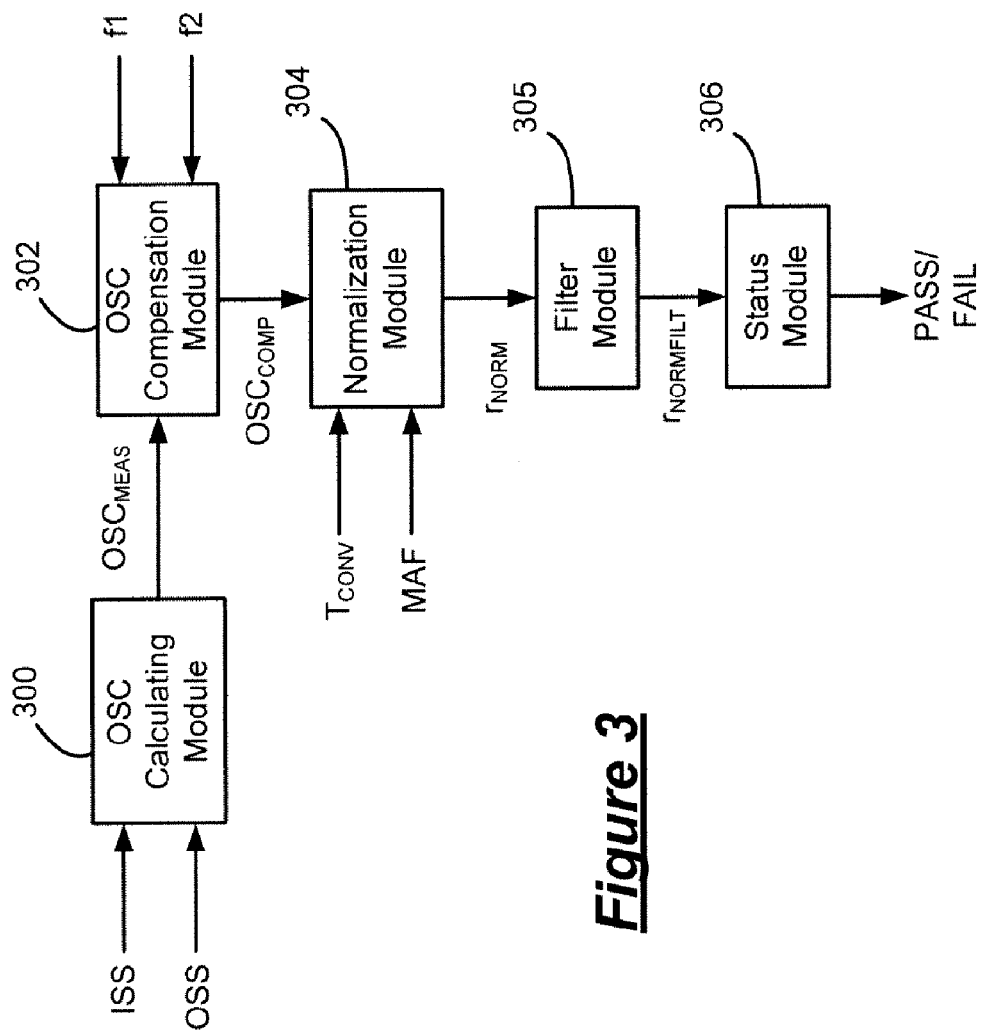
FIG. 3 schematically illustrates exemplary modules that execute the OSC monitoring control of the present invention.

Referring now to FIG. 3, exemplary modules are illustrated that execute the OSC monitoring control of the present invention. The modules include an OSC calculating module 300, a compensation module 302, a normalization module 304, a filter module 305 and a status module 306. The OSC calculating module 300 determines $OSC_{MEAS}$ based on the ISS and the OSS. The compensation module 302, determines $OSC_{COMP}$ based on the $OSC_{MEAS}$, f1 and f2. The normalization module 304 determines $r_{NORM}$ based on $OSC_{COMP}$, $T_{CONV}$ and MAF. The filter module 305 filters $r_{NORM}$ to provide $r_{NORMFILT}$. The status module 306 determines the PASS/FAIL status based on $r_{NORMFILT}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An oxygen storage capacity (OSC) monitoring system for a vehicle having a catalytic converter, comprising:
 a first module that determines a measured OSC based on an inlet sensor signal (ISS) that is responsive to an oxygen content of exhaust flowing into said catalytic converter; and
 a second module that determines a normalization ratio based on said measured OSC and that determines a PASS/FAIL status of said catalytic converter based on said normalization ratio,
 wherein said second module determines said normalization ratio based on at least one of a best unacceptable OSC and a worst acceptable OSC, wherein said best unacceptable OSC is a predetermined maximum unacceptable OSC for said catalytic converter, and wherein said worst acceptable OSC is a predetermined minimum acceptable OSC for said catalytic converter.

2. The OSC monitoring system of claim 1 further comprising a compensation module that compensates said measured OSC to provide a compensated OSC and wherein said normalization ratio is determined based on said compensated OSC.

3. The OSC monitoring system of claim 1 wherein said second module determines said best unacceptable OSC and said worst acceptable OSC.

4. The OSC monitoring system of claim 3 wherein said best unacceptable OSC is determined from a function based on a converter temperature and a mass air flow (MAF).

5. The OSC monitoring system of claim 3 wherein said worst acceptable OSC is determined from a look-up table based on a converter temperature and a mass air flow (MAF).

6. The OSC monitoring system of claim 1 wherein said second module compares said normalization ratio to a threshold normalization ratio and indicates a FAIL status when said normalization ratio exceeds said threshold normalization ratio.

7. The OSC monitoring system of claim 1 further comprising an outlet oxygen sensor that generates an outlet sensor signal (OSS) based on an oxygen content of exhaust flowing from said catalytic converter, wherein said first module further determines said measured OSC based on said OSS.

8. The OSC monitoring system of claim 1 wherein said normalization ratio is a filtered normalization ratio.

9. The OSC monitoring system of claim 1, wherein said second module:
 determines a first difference based on said best unacceptable OSC and a compensated OSC;
 determines a second difference based on said best unacceptable OSC and said worst acceptable OSC; and
 determines said normalization ratio based on said first difference and said second difference.

10. The OSC monitoring system of claim 9, wherein said second module:
 determines a first compensation factor based on a percentage of ethanol present in a fuel;
 determines a second compensation factor based on a fuel trim average; and
 determines said compensated OSC based on said first compensation factor and said second compensation factor.

11. The OSC monitoring system of claim 10, wherein said second module:
 determines said first difference based on a difference between said best unacceptable OS and said compensated OSC;
 determines said second difference based on a difference between said best unacceptable OS and said worst acceptable OSC; and
 determines said compensated OSC based on multiplication of said measured OSC by said first compensation factor and said second compensation factor.

12. The OSC monitoring system of claim 1, wherein said second module determines said best unacceptable OSC based on a converter temperature and a long term steady-state temperature.

13. The OSC monitoring system of claim 12, wherein said second module determines said converter temperature based on said long term steady-state temperature, an engine speed, and a mass air flow.

14. The OSC monitoring system of claim 13, wherein said second module determines said converter temperature based on an engine speed constant, a mass air flow constant, an offset constant, and a filter coefficient.

15. A method of monitoring an oxygen storage capacity (OSC) in a vehicle having a catalytic converter, comprising:
 generating an inlet signal based on an oxygen content of exhaust flowing into said catalytic converter;
 determining a measured OSC based on said inlet signal;
 calculating a normalization ratio based on said measured OSC;

determining a PASS/FAIL status of said catalytic converter based on said normalization ratio;

comparing said normalization ratio to a threshold normalization ratio; and indicating a FAIL status via at least one module when said normalization ratio exceeds said threshold normalization ratio.

16. The method of claim 15 further comprising compensating said measured OSC to provide a compensated OSC, wherein said normalization ratio is calculated based on said compensated OSC.

17. The method of claim 15 further comprising determining a best unacceptable OSC and a worst acceptable OSC, wherein:

said normalization ratio is calculated based on said best unacceptable OSC and said worst acceptable OSC;

said best unacceptable OSC is a predetermined maximum unacceptable OSC for said catalytic converter; and said worst acceptable OSC is a predetermined minimum acceptable OSC for said catalytic converter.

18. The method of claim 17 wherein said best unacceptable OSC is determined from a function based on a converter temperature and a mass air flow (MAF).

19. The method of claim 17 wherein said worst acceptable OSC is determined from a function based on a converter temperature and a mass air flow (MAF).

20. The method of claim 15 further comprising generating an outlet signal based on an oxygen content of exhaust flowing from said catalytic converter, wherein said measured OSC is based on said outlet signal.

21. The method of claim 15 wherein said normalization ratio is a filtered normalization ratio.

22. An oxygen storage capacity (OSC) monitoring system for a vehicle having a catalytic converter, comprising:

a first module that determines a measured OSC based on an inlet sensor signal (ISS) that is responsive to an oxygen content of exhaust flowing into said catalytic converter; and a second module that:

determines a normalization ratio based on said measured OSC;

determines a PASS/FAIL status of said catalytic converter based on said normalization ratio;

determines a compensated OSC based on said measured OSC and at least one of (i) a percentage of ethanol present in a fuel and (ii) a fuel trim average; and determines said normalization ratio based on said compensated OSC.

23. The OSC monitoring system of claim 22, wherein said second module:

determines a first compensation factor based on said percentage of ethanol present in said fuel;

determines a second compensation factor based on said fuel trim average; and determines said compensated OSC based on said first compensation factor and said second compensation factor.

* * * * *